United States Patent
Butters et al.

(10) Patent No.: US 7,588,688 B2
(45) Date of Patent: Sep. 15, 2009

(54) INTEGRATED PARTICULATE FILTRATION AND DEWATERING SYSTEM

(75) Inventors: Brian E. Butters, London (CA); Anthony L. Powell, London (CA)

(73) Assignee: Purifics Environmental Technologies, Inc., London, Ontario (CA)

( * ) Notice: Subject to any disclaimer, the term of this patent is extended or adjusted under 35 U.S.C. 154(b) by 0 days.

(21) Appl. No.: 11/681,555

(22) Filed: Mar. 2, 2007

(65) Prior Publication Data

US 2007/0205163 A1 Sep. 6, 2007

Related U.S. Application Data

(60) Provisional application No. 60/779,270, filed on Mar. 3, 2006.

(51) Int. Cl.
*C02F 9/02* (2006.01)
*B01D 61/58* (2006.01)

(52) U.S. Cl. .......... 210/650; 210/791; 210/805; 210/806; 210/195.2; 210/257.2; 210/299

(58) Field of Classification Search .......... 210/650, 210/791, 800, 805, 806, 195.2, 257.2, 258, 210/259, 299, 321.6, 321.69, 513
See application file for complete search history.

(56) References Cited

U.S. PATENT DOCUMENTS

| 4,812,237 | A | * | 3/1989 | Cawley et al. | .............. 210/650 |
|---|---|---|---|---|---|
| 5,409,613 | A | * | 4/1995 | Weaver | .................... 210/195.2 |
| 5,462,674 | A | | 10/1995 | Butters et al. | |
| 5,932,091 | A | * | 8/1999 | Tompkins et al. | ........... 210/258 |
| 6,027,656 | A | * | 2/2000 | Henttonen et al. | .......... 210/650 |
| 6,136,203 | A | | 10/2000 | Butters et al. | |
| 6,395,181 | B1 | * | 5/2002 | Mullerheim | ................ 210/650 |
| 2004/0016699 | A1 | * | 1/2004 | Bayevsky | .............. 210/321.69 |
| 2004/0134856 | A1 | * | 7/2004 | Fujii et al. | ................... 210/650 |
| 2005/0006305 | A1 | * | 1/2005 | Juby et al. | .................. 210/603 |
| 2005/0288512 | A1 | | 12/2005 | Butters et al. | |
| 2006/0000771 | A1 | * | 1/2006 | Gaid et al. | .................. 210/650 |
| 2006/0169636 | A1 | * | 8/2006 | Devine | ....................... 210/650 |

* cited by examiner

*Primary Examiner*—Christopher Upton
(74) *Attorney, Agent, or Firm*—Baker & McKenzie LLP

(57) ABSTRACT

The disclosed principles for providing a chemical-free filtering of particulate down below sub-micron levels, while concentrating the particulate into a sludge. The disclosed principles integrate cross-flow filtration (i.e., micro-filtration or ultra-filtration) with a settling tank (or "weir") to provide sequential filtration and dewatering of an aqueous media. The disclosed technique operates chemical-free and is continuous. Applications for systems and processes in accordance with the disclosed technique are wide, and include aggregate fines removal, sediment removal, replacement for clarifiers, etc.

22 Claims, 3 Drawing Sheets

INTEGRATED PARTICULATE FILTRATION AND DEWATERING SYSTEM

CROSS-REFERENCE TO RELATED APPLICATION

This application claims the benefit of U.S. Provisional Application Ser. No. 60/779,270, filed on Mar. 3, 2006, and entitled "INTEGRATED PARTICULATE FILTRATION AND DEWATERING SYSTEM," commonly assigned with the present application and incorporated herein by reference for all purposes.

TECHNICAL FIELD

Disclosed embodiments herein relate generally to filtering systems, and more particularly to an integrated filtration and dewatering system and related methods for filtering particulate matter from a contaminated fluid.

BACKGROUND

One of the more common technologies for treating waste water is based on a settling process, often using fixating agents such as hydroxide and sulfates. The fixating chemicals are added to water in a settling tank to absorb or otherwise transform the contaminants into materials which settle to the bottom of the tank. This technology uses comparatively simple equipment and permits the processing of large volumes of waste waters, without adding materials which would result in an environmentally undesirable effluent stream. In fact, in some systems, no fixing agents are used because the contaminants are sufficiently large to settle in the tanks. However, in many cases, use of ordinary settling processes fails to reduce contaminant concentrations to levels low enough to meet desired requirements, without using excessive amounts of materials, over a protracted processing time. In addition, traditional settling processes often require extremely large settling reservoir to provide adequate settling time for smaller particles.

In addition to settling tanks, conventional treatment processes to remove undissolved solids include the use of settling tanks, clarifiers, centrifuges, gravity filters and pressure filters. The processed effluent, freed of undissolved solids by such techniques or combined techniques still requires further processing to remove dissolved solids. Conventional approaches to removing dissolved solids include precipitation initiated by pH adjustment or reagent addition, flocculation and settling, micro-filtration and precipitate concentration through centrifuge or plate press action.

The composition of filter elements for such techniques, depending on the process employed and particulate matter to be removed, can be perforated or slotted metal, or polymeric elements such as polypropylene or polyester cartridges. High density inorganic adsorbent materials (HDIA) can also be used to promote solid separation in the flocculation phase. Typically, these materials have been natural or synthetic low density aluminum silicates called zeolites, used to capture positively charged ions of the filtered elements. In addition, beds of sand or other particulate matter are used in a mechanical filtration process called polishing. The contaminated water is passed one or more times through the bed with or without periodic backwashes to flush the entrapped residue upstream for flocculation and micro-filtration.

These known procedures and techniques for separating and removing aqueous based contaminants greatly reduce the environmental hazards. Unfortunately, however, a high degree of desired effluent purity may require repeated cycling through the individual filtration steps with associated storage, time, and cost penalties, if such a high level can be achieved at all. As a result, available conventional systems can suffer one or more of the short-comings discussed above.

BRIEF SUMMARY

The disclosed principles provide for a chemical-free filtering of particulate down below sub-micron levels, while concentrating the particulate into a sludge. The disclosed principles integrate cross-flow filtration (i.e., micro-filtration or ultra-filtration) with a settling tank (or "weir") to provide sequential filtration and dewatering of an aqueous media. The disclosed technique operates chemical-free and is continuous in a closed-loop system. Applications for systems and processes in accordance with the disclosed technique are wide, and include aggregate fines removal, sediment removal, replacement for clarifiers, etc.

In one aspect, an integrated filtration and dewatering system for filtering particulate matter from a contaminated fluid is provided. In one embodiment, the system comprises a feed stream providing a contaminated fluid into the system. In addition, such a system includes at least one settling tank for holding the contaminated fluid so that at least some of the particulate matter settles to the bottom of the at least one settling tank. This embodiment of a system also includes a cross-flow filter for filtering fluid taken from near the top of the volume of fluid in the at least one settling tank for removing substantially all remaining particulate matter from the fluid, as well as an output stream disbursing filtered fluid from the cross-flow filter outside the system.

In another aspect, a method of filtering and dewatering particulate matter from a contaminated fluid is provided. In one embodiment, a method comprises providing a contaminated fluid via a feed stream, and holding the contaminated fluid in at least one settling tank to cause at least some of the particulate matter to settle to the bottom of the at least one settling tank. In addition, the method could include filtering fluid taken from near the top of the volume of fluid in the at least one settling tank with a cross-flow filter to remove substantially all remaining particulate matter from the fluid. Then, such a method could include disbursing filtered fluid from the cross-flow filter.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION

Figures 1, 2:
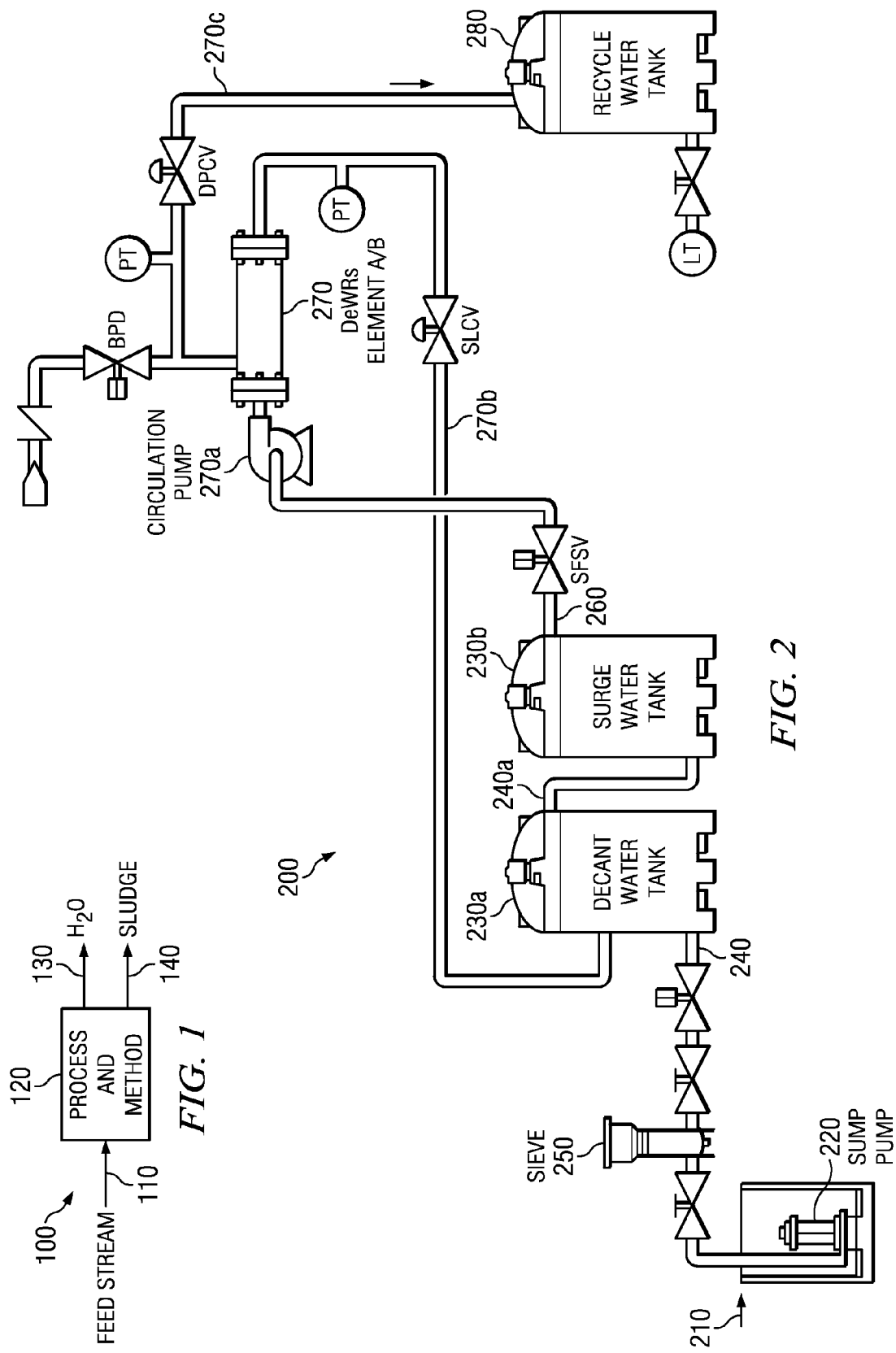
FIG. 1 illustrates a high-level block diagram demonstrating integrated filtration and dewatering according to the disclosed principles.
FIG. 2 illustrates one embodiment of an integrated filtration and dewatering system constructed according to the disclosed principles.

Referring initially to FIG. 1, illustrated is a high-level block diagram 100 demonstrating integrated filtration and dewatering according to the disclosed principles. The diagram 100 includes a feed stream 110, which provides an incoming aqueous media in need of filtration. The feed stream enters the disclosed process and method 120, which is discussed in greater detail below, such that the non-aqueous particles in the media are filtered from the feed stream 110.

Once filtered and dewatered in accordance with the disclosed principles, the media in the feed stream 110 is separated into two distinct outputs. Specifically, the contaminated aqueous media is separated by the disclosed process into water 130 (in this example) and a sludge 140 comprising the particles filtered (and "dewatered") by the disclosed process 120. While a contaminated aqueous media is discussed throughout the present disclosure, it should be noted that any type of liquid in need of particle filtration may been filtered in accordance with the disclosed principles, as will be clear from the discussion below.

Turning to FIG. 2, illustrated is one embodiment of an integrated filtration and dewatering system 200 constructed according to the disclosed principles. Stated another way, the disclosed principles provide for a dewatering and reuse system (DeWRS™) for removing particulate matter from fluids. The system 200 includes a feed line 210 where a liquid media in need of having particles therein filtered out is fed into the system 200. For example, the contaminated media may contain particulate matter, such as aggregate fines that may accumulate in a liquid used as a coolant.

More specifically, in construction applications involving the wet-cutting of concrete, tile or certain stones, water is typically employed as a coolant (and for dust suppression) for the blade. As the water (or other coolant liquid) is sprayed onto the blade or other parts of the saw during cutting, aggregate fines build-up in the coolant run-off. When the coolant is sought to be recycled during the cutting operation, the build-up from the particulate matter coming off of the concrete, tile or stone should be filtered from the coolant so as not to clog or otherwise detrimentally impact the coolant circulation system. Thus, the system 200 in FIG. 2 may be employed to efficiently filter the particulate from the contaminated liquid coolant so that the filtered coolant may be recirculated without problems. Of course, while the below discussion refers to aggregate fines in such an exemplary wet-cutting application, those skilled in the art will see the broader application of the disclosed systems and processes.

Looking specifically at this type of application, the used liquid media is input to the system 200 via the feed line 210 and pumped, via a sump pump 220, into one or more settling tanks 230a, 230b through an intake line 240. In some embodiments, the first settling tank 230a may specifically be a decanting tank, removing a larger concentration of particulate matter early in the process. Of course, the second tank 230b may also be considered a decanting tank. In addition, the system 200 may include a sieve 250 prior to the settling tanks 230a, 230b for filtering and breaking down larger aggregate fines in the incoming media. While the sieve 250 is not required, it may prove beneficial to employ it so as to prevent clogging of the system 200 with oversized particles further down the line.

Once the media reaches the settling tanks 230a, 230b, gravity is used to begin the filtering process. Specifically, within the settling tanks 230a, 230b, there is a particulate concentration gradient where the highest concentration is at the bottom, and the lowest is at the top. As mentioned, gravity is used to create the solids/particulate concentration gradient as the heavier particulate matter drops to the bottom of the tanks 230a, 230b. While two settling tanks 230a, 230b are illustrated in this embodiment, the disclosed principles are broad enough to encompass one tank, two tanks, or even three or more settling tanks, depending on the particular application. Of course, the greater the number and size of tanks, the longer the settling time of the incoming fluid.

While gravity causes the particulate matter to drop to the bottom of the tanks 230a, 230b, fluid is pumped from near the top of the tanks 230a, 230b and is fed to a cross-flow filter 270. The fluid is pumped into the cross-flow filter 270 via line 260 and using, in this embodiment, a circulation pump 270a. The cross-flow filter 270 separates and concentrates the solids/particulates, and the concentrated fluid is sent back to the settling tanks 230a, 230b via return line 270b. The concentrated fluid is discharged near the middle of the tanks 230a, 230b to allow the solids to drop and the water to rise, and as such helps to maintain the solid/concentration gradient. The permeate from the cross-flow filter 270 (essentially free of solids) is output from the filter 270 via output line 270c. The permeate may be output to a storage tank 280 where it can then be re-used or discharged. For overall efficiency, the permeate flow rate and the raw feed (system intake) flow rate are balanced to keep a relatively constant level in the settling tanks 230a, 230b.

The construction of the cross-flow filter 270 may be selected based on the intended application for the system 200. For example, the filter element(s) may be polymeric or even ceramic. While polymeric filter elements are typically satisfactory for many applications, the type of particulate being filtered from the incoming fluid may result in ceramic filter elements being a better choice. This is especially the case when filtering abrasive particulate matter from the fluid. Aggregate fines, for instance, are relatively abrasive, and would likely tear apart a polymeric filter over time. As such, ceramic elements may be the preferred choice for most aggregate fines applications.

Aside from tolerating the abrasiveness of certain particulates, ceramic filter elements also have other advantages over polymeric or other similar element compositions. For example, the abrasiveness of those certain particulates act as a honing material, which keeps the ceramic filter element clean by the mere flow through the filter 270, and eliminates the need for potential chemical or mechanical cleaning maintenance requirements. Thus, ceramic elements used for abrasive particulates provides a method of 'self-cleaning' the filter 270. In addition, the filtered solid or particulate can create a 'dynamic filter' in the ceramic element which provides smaller pore-size filtration capabilities as the particulate builds-up on the elements. This can prevent foulants from entering the ceramic, and is described in greater detail in U.S. Pat. No. 6,136,203 and U.S. application Ser. No. 11/044,377, which are commonly assigned with the present disclosure and incorporated herein by reference in their entirety.

Regardless of the type of filter 270 element employed, at certain points during operation of the system 200, the filter 270 will eventually need to be cleaned so that it's efficiency is kept up. While polymeric filter elements are typically replaced, ceramic elements can be "back-pulsed" instead of back-washed. Thus these types of elements are typically useable in a continuous manner and even eliminates the loss of permeate that is typically used for back-washing other types of filters. Such sonic pulsing or shock wave, or "back-pulsing," of ceramic filter elements is disclosed in U.S. Pat. No. 5,462,674, which is also commonly assigned with the present disclosure and incorporated herein by reference in its entirety. Further, ceramics are intolerant to degradation from chemicals (organic and inorganic), such as solvents, acids or bases. Ceramics also do not tear or rip, and the pore sizes do not stretch with time; thus, ceramic filters do not typically have to be replaced. Also, if the ceramic filters get plugged with oil (or other non-aqueous phase fluid), they can be re-stored by 'burning' (i.e., "high temperature degas") the filter element.

While a system constructed and operated according to the disclosed principles can operate almost continuously, eventually the particulate (or, more generally, the sludge) in the settling tanks 230a, 230b builds up over time. When this occurs, the build up may be removed from the tanks 230a, 230b in various ways. For example, the sludge may be scooped out, such as using a backhoe or other similar equipment. Optionally, the tanks 230a, 230b may be drained and the sludge pushed or scraped out of the tanks 230a, 230b. Once removed, if the particulate product is of value, then it may be stored for use at a future time. In such an application, the particulate may be $TiO_2$, such as that found in a photocatalytic contamination treatment system. Over time, the $TiO_2$ particulate settled at the bottom of the tanks 230a, 230b may be recovered and reused, further increasing efficiency and decreasing overall costs.

Figure 3:
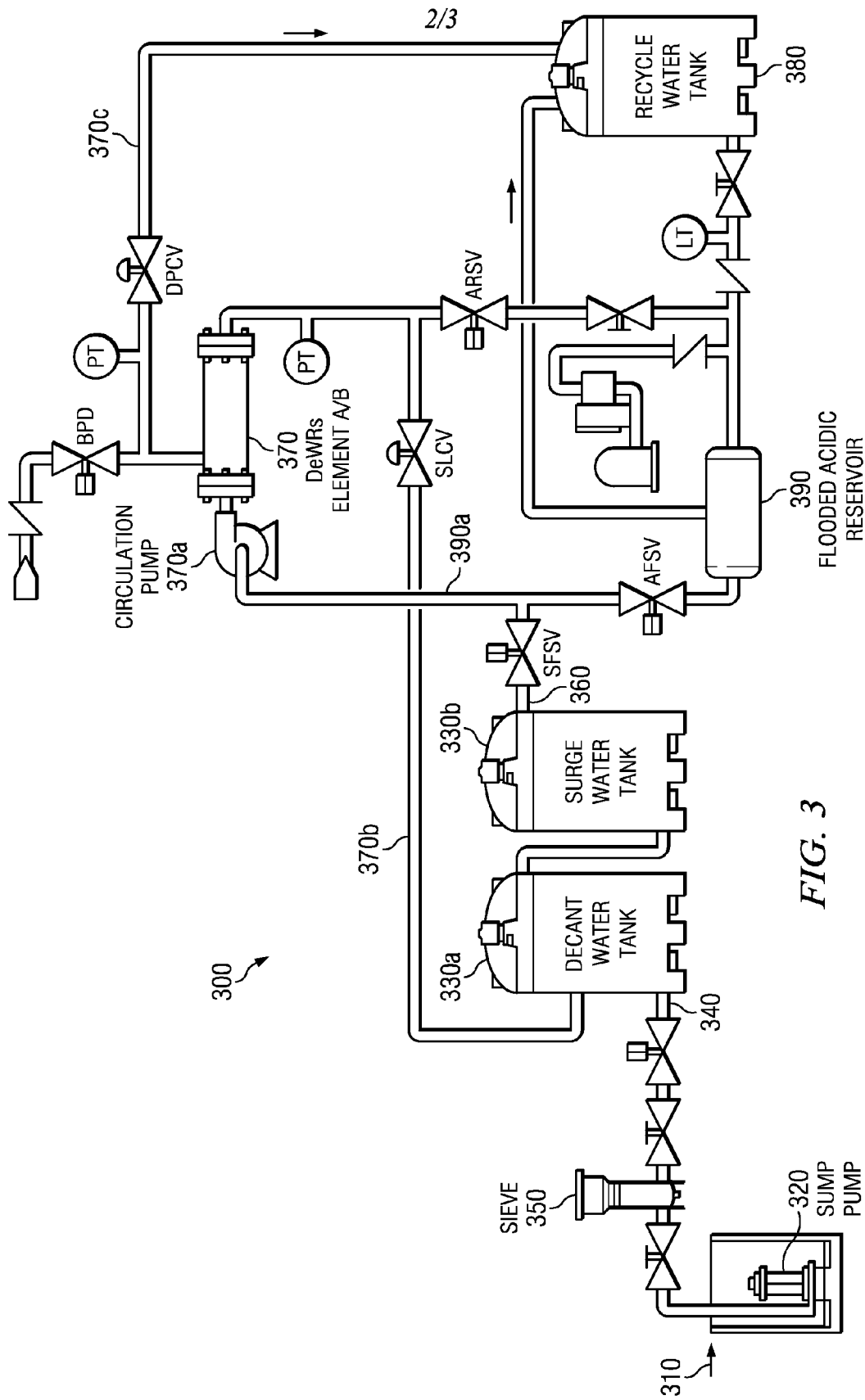
FIG. 3 illustrates another embodiment of an integrated filtration and dewatering system constructed according to the disclosed principles.

Looking now at FIG. 3, illustrated is another embodiment of an integrated filtration and dewatering system 300 constructed according to the disclosed principles. This system 300 still includes a feed line 310 where a liquid media in need of having particles therein filtered out is fed into the system 300. The contaminated media may once again contain basically any type of particulate matter, such as aggregate fines.

The system 300 also includes a sump pump 320 used to pump the media through the feed line 310 and into two settling tanks 330a, 330b through an intake line 340. In addition, the system 300 may also include a sieve 350 prior to the settling tanks 330a, 330b for once again filtering and breaking down larger particles in the incoming fluid, if needed. Gravity is used in the settling tanks 330a, 330b to provide the particulate concentration gradient discussed above, where the highest concentration is at the bottom and the lowest is at the top. Fluid is again pumped from near the top of the tanks 330a, 330b and is fed to a cross-flow filter 370. The fluid is pumped into the cross-flow filter 370 via line 360 and using, once again, a circulation pump 370a. The cross-flow filter 370 is again used to separate and concentrate the solids/particulates, and the concentrated fluid is sent back to the settling tanks 330a, 330b via return line 370b. The permeate from the cross-flow filter 370 is output from the filter 370 via output line 370c, and deposited in a storage tank 380 where it can then be re-used or discharged.

The system 300 in FIG. 3 differs from the system 200 in FIG. 2 in that it further includes an acidic reservoir 390. The acidic reservoir 390 may be employed for aggregate fines applications, as discussed above. Specifically, instead of the filter "cleaning" provided by the continuous flow of abrasive particulate discussed above, when the system 300 is idle for a given period of time, aggregate (e.g., calcium carbonate, or any appropriate chemical depending on application) present on the filter element(s) in the filter 370 often dries and hardens. The acidic solution from the reservoir 390 may thus be used to dissolve the layer of dried aggregate so that optimum filter flow ensues. Of course, this disclose principles are not limited to acidic solutions for such applications, but is instead broad enough to encompass any type of solution useable to clean the element(s) in the filter 370 in situ, while the system 300 is operating. By providing an in situ approach, the filter 370 does not have to be taken off-line and/or disassembled, as in conventional systems, in order to clean particles that have hardened on the element(s).

Any system constructed and/or operated according to the disclosed principles provides several advantages over conventional systems and approaches. More specifically, the disclosed principles may be used to filter/dewater particulate fines from fluid found in basically any source. As such, the disclosed principles may be employed to filter/dewater right from pond or lagoon, or large body of water. In addition, the disclosed principles are applicable to filter basically anything that is heavier than the fluid being filtered, and that typically is in a non-liquid phase (i.e., solid particulate). Exemplary applications for a system constructed according the disclosed principles include silt removal, cutting & grinding processes for stone, tile, concrete, etc., wash water filtering and reclamation, agricultural applications like sludge or manure dewatering, and automated sump and trench washing. In a specific application, the disclosed principles may be used for $TiO_2$ removal and recovery in photocatalytic decontamination systems, as mentioned above, in order to reduce overall costs by recovering the $TiO_2$ rather than replacing it. Of course, product recovery without added chemicals is also possible with a system or process according to the disclosed principles.

Another advantage is that the dewatered particulate may be recovered, such as by scooping it out of the tanks or decantering it, which is advantageous when the dewatered product has value. Moreover, the disclosed principles are advantageous because the particulate is not only separated and pulled, but it is actually concentrates the particulate as well. As a result, an additional step to concentrate the product is not required. Since the disclosed principles provide for phase block of particulate matter, rather than simply a filter, complete product recovery is possible. Still other advantages are that as the concentration of solids increase in the settling tank(s), the rate of drop in the solids begins to increase because solids tend to push other solids down. Consequently, over time the bottoms of the settling tank contain sludge-like concentrations, not requiring further dewatering technologies such as filter presses. This minimizes water-loss and acts as a dewatering system for the particulate. Simple evaporation can be used to further dewater, if desired. Moreover, the disclosed systems are closed-loop systems, and the recirculation stream forms a dynamic filter.

Utilizing gravity to settle the concentrated solids also provides both a low and constant concentration feed to the cross-flow filter. A low concentration means that the size of the filter may be significantly smaller (i.e., less capital and operating cost). To achieve the same level or volume of dewatering with cross-flow filtration alone is not possible using the same system pressures and the same size filter element or membrane. The surface area of the element would have to be significantly larger, which typically means significantly higher cost and complexity. Thus, the physical size and complexity of a system constructed as disclosed herein is much less than conventional technologies for removal and dewatering of solids. Moreover, a constant concentration feed means that the system is easy to operate and control. Additionally, the steady state flow accommodated by the disclosed systems and processes can easily handle intermittent surge demands, as required.

Another key feature of the disclosed principles includes the ability to add abrasive materials to the incoming contaminated fluid, if such abrasive particles are desired to help keep the filter element(s) clean as discussed in detail above. Thus, if the particulate material is not abrasive enough, other materials could be added to provide the abrasiveness, such as $TiO_2$. In addition, other agents could be added to the incoming fluid to provide greater settling in the tank, or to provide removal of soluble items. For example, ferric-chloride could be added to the feed water to "flocculate" dissolved metals or other species in the water (which might normally pass through micro- or ultra-filtration). What this accomplishes is the pulling together of dissolved metals or certain very fine particulate or even other dissolved matter. The flocculating agent basically removes the charge off the molecules of such species so they come together into a larger "macro-molecule." Coagulation would occur in the settling tank(s), and the filter would prevent the matter from being discharged.

In short, there is first the flocculation (removing the charge) and then the coagulation (coming together) of particles or molecules that would normally be too dissolved or too small to be recovered on their own. Thus, in systems constructed according to the disclosed principles, flocculants may be added upstream of the system, and the settling tanks would act as the coagulating stage. As a result, the disclosed system would replace the clarifier that is typically used to collect the flocculated/coagulated particles, and thus the settling tanks would recover the larger coagulated molecules, while the cross-flow filter would be used to recover those particles that are still too small to settle after adding the flocculating agent. Beneficially, many conventional clarifiers are extremely large (e.g., pond-size or larger), while the disclosed principles provide a system so relatively small that it may even be palletized next to the settling tanks. Still further, the pH in the incoming fluid may also be adjusted to cause the particulate to settle out/agglomerate. Of course, flocculating, coagulating or other similar agents used to group particles into macro-molecules are not required in the practice of a system or method constructed according to the disclosed principles.

Figure 4:
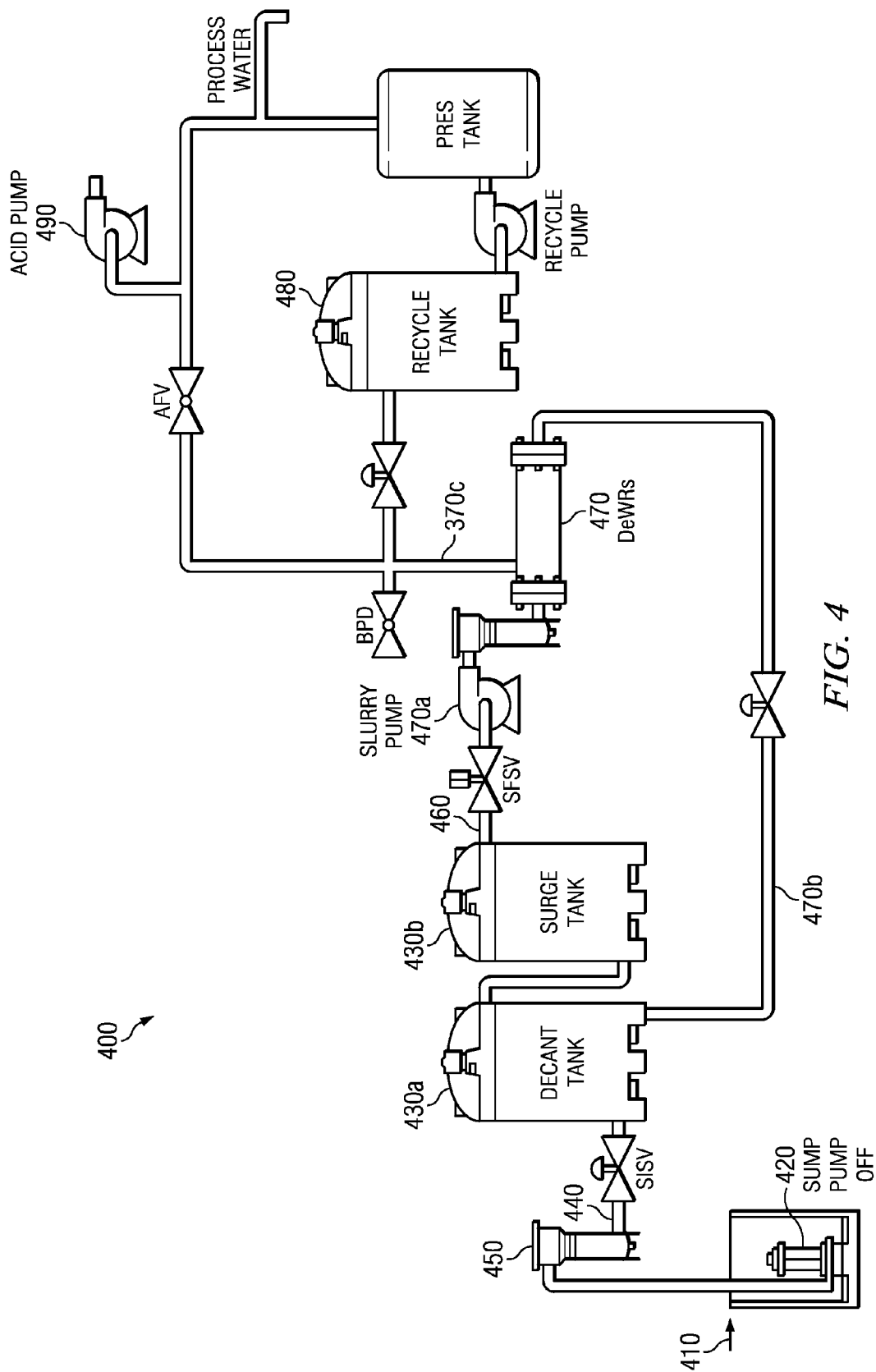
FIG. 4 illustrates yet another embodiment of an integrated filtration and dewatering system constructed according to the disclosed principles.

Looking finally at FIG. 4, illustrated is another embodiment of an integrated filtration and dewatering system 400 constructed according to the disclosed principles, which is similar to the system 300 in FIG. 3. This system 400 still includes a feed line 410, a sump pump 420, and two settling tanks 430a, 430b through an intake line 440. In addition, the system 400 also includes a sieve 450 prior to the settling tanks 430a, 430b for once again filtering and breaking down larger particles in the incoming fluid, if needed. Fluid is again pumped from near the top of the tanks 430a, 430b and is fed to a cross-flow filter 470. The fluid is pumped into the cross-flow filter 470 via line 460 and using, once again, a circulation pump 470a. The cross-flow filter 470 is again used to separate and concentrate the solids/particulates, and the concentrated fluid is sent back to the settling tanks 430a, 430b via return line 470b. The permeate from the cross-flow filter 470 is output from the filter 470 via output line 470c, and deposited in a storage tank 480 where it can then be re-used or discharged. The system 400 also includes an acidic reservoir 490 that may be employed for aggregate fines applications, as discussed above.

The system 400 in FIG. 4 differs from the system 300 in FIG. 3 in that the acidic reservoir 490 is placed at the backend of the filtering system 400. Specifically, filtered water is pumped back through the ceramic membranes (i.e., "backwards"), and the acid is added to that water. As a result, the acid gets to the carbonate (other material, as discussed above) quicker, and thus less acid needs to be used in the system 400. Accordingly, system and process expense can be further reduced by employing an embodiment of the disclosed principles in accordance with FIG. 4.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An integrated filtration and dewatering system for filtering particulate matter from a contaminated fluid, the system comprising:
   a feed stream providing a contaminated fluid into the system;
   at least one gravity-only settling tank for receiving the contaminated fluid at the approximate middle or below of the volume of fluid in the at least one settle tank, and holding the contaminated fluid so that most of the particulate matter settles to the bottom of the at least one settling tank; and
   a micro-filtration unit coupled to the top of the at least one settling tank for filtering fluid taken from the uppermost part of the volume of fluid in the at least one settling tank for removing substantially all remaining particulate matter from the fluid, the micro-filtration unit providing:
   a return stream containing the filtered remaining particulate matter to the approximate middle or below of the volume of fluid in the at least one settle tank; and
   an output stream disbursing filtered fluid from the micro-filtration unit outside the system.

2. An integrated filtration and dewatering system according to claim 1, wherein the feed stream comprises a sump pump for providing the fluid into the system.

3. An integrated filtration and dewatering system according to claim 1, wherein the system further comprises a sieve configured to receive the fluid provided by the feed stream and filter at least a portion of the particulate matter from the fluid before it reaches the at least one settling tank.

4. An integrated filtration and dewatering system according to claim 1, wherein the system further comprises a storage tank for storing the filtered fluid disbursed from the output stream.

5. An integrated filtration and dewatering system according to claim 1, wherein the micro-filtration unit comprises a cross-flow filtration unit.

6. An integrated filtration and dewatering system according to claim 5, wherein the cross-flow filtration unit comprises at least one ceramic filter element therein.

7. An integrated filtration and dewatering system according to claim 6, wherein the system further comprises a filter cleaner comprising a chemical solution stored in a reservoir coupled to the cross-flow filtration unit, the chemical solution flowed through the cross-flow filter sufficiently to remove particulate build-up on the at least one ceramic filter element while filtering the fluid taken from near the top of the volume of fluid in the at least one settling tank.

8. An integrated filtration and dewatering system according to claim 7, wherein the chemical solution is an acidic solution.

9. An integrated filtration and dewatering system according to claim 6, wherein the system further comprises a filter cleaner comprising a sonic pulse configured to remove particulate build-up on the at least one ceramic filter element while filtering the fluid taken from near the top of the volume of fluid in the at least one settling tank.

10. An integrated filtration and dewatering system according to claim 6, wherein the system further comprises a filter cleaner comprising an abrasive particulate in the fluid passing through the cross-flow filtration unit, the abrasive particulate configured to remove particulate build-up on the at least one ceramic filter element by passing therethrough while filtering the fluid taken from near the top of the volume of fluid in the at least one settling tank.

11. An integrated filtration and dewatering system according to claim 10, wherein the abrasive particulate is $TiO_2$.

12. A method of filtering and dewatering particulate matter from a contaminated fluid, the method comprising:
    providing a contaminated fluid via a feed stream to at least one gravity-only settling tank at the approximate middle or below of the volume fluid in the at least one settling tank;
    holding the contaminated fluid in the at least one settling tank to cause most of the particulate matter to settle to the bottom of the at least one settling tank;
    filtering fluid taken from the uppermost part of the volume of fluid in the at least one settling tank with a micro-filtration unit to remove substantially all remaining particulate matter from the fluid;
    providing a return stream that contains the filtered remaining particulate matter from the micro-filtration unit to the approximate middle or below of the volume of fluid in the at least one settling tank; and
    disbursing filtered fluid from the micro-filtration unit.

13. A method according to claim 12, wherein providing the fluid comprises pumping the fluid into the at least one settling tank using a sump pump.

14. A method according to claim 12, further comprising filtering at least a portion of the particulate matter from the contaminated fluid with a sieve before it reaches the at least one settling tank.

15. A method according to claim 12, further comprising storing the filtered fluid disbursed from the micro-filtration unit in a storage tank.

16. A method according to claim 12, wherein filtering fluid with a micro-filtration unit comprises filtering the fluid with a cross-flow filtration unit.

17. A method according to claim 16, wherein the filtering fluid with a cross-flow filtration unit further comprises filtering with a cross-flow filtration unit having at least one ceramic filter element therein.

18. A method according to claim 17, further comprising cleaning the at least one ceramic filter element in the cross-flow filtration unit while filtering the fluid taken from near the top of the volume of fluid in the at least one settling tank with a chemical solution flowed through the cross-flow filtration unit sufficiently to remove particulate build-up on the at least one ceramic filter element.

19. A method according to claim 18, wherein the chemical solution is an acidic solution.

20. A method according to claim 17, further comprising cleaning the at least one ceramic filter element in the cross-flow filtration unit while filtering the fluid taken from near the top of the volume of fluid in the at least one settling tank with a sonic pulse configured to remove particulate build-up on the at least one ceramic filter element.

21. A method according to claim 17, further comprising cleaning the at least one ceramic filter element in the cross-flow filtration unit while filtering the fluid taken from near the top of the volume of fluid in the at least one settling tank with an abrasive particulate in the fluid passing through the cross-flow filtration unit, the abrasive particulate configured to remove particulate build-up on the at least one ceramic filter element by passing therethrough.

22. A method according to claim 21, wherein the abrasive particulate is $TiO_2$.

* * * * *